March 4, 1924.
W. H. HOBBS
1,485,924
PLANT PROTECTOR
Filed Feb. 28, 1923
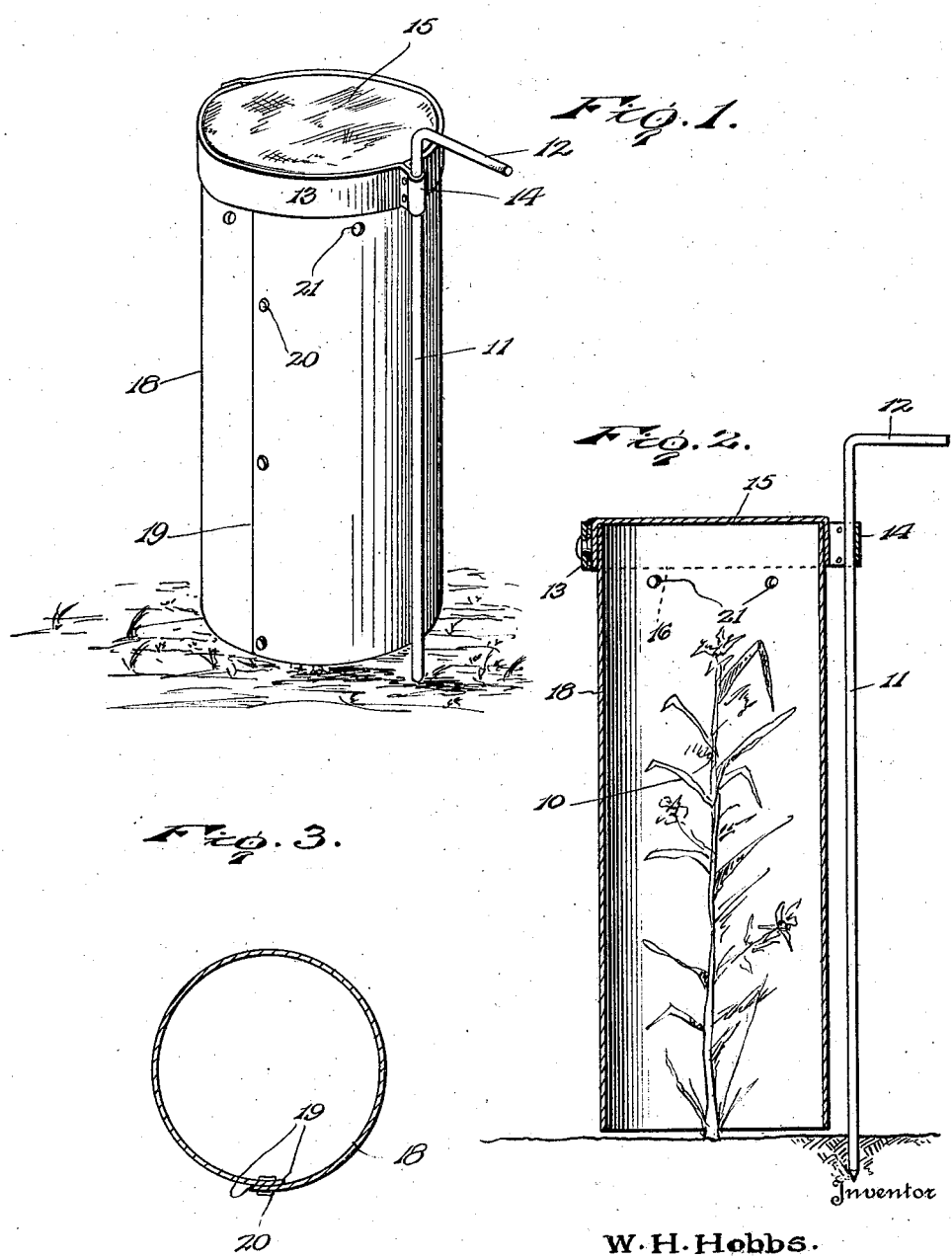
Inventor
W. H. Hobbs.
By
Lacey & Lacey, Attorneys Patented Mar. 4, 1924.

1,485,924

UNITED STATES PATENT OFFICE.

WILLIAM H. HOBBS, OF BARNESVILLE, OHIO.

PLANT PROTECTOR.

Application filed February 28, 1923. Serial No. 621,363.

*To all whom it may concern:*

Be it known that I, WILLIAM H. HOBBS, a citizen of the United States, residing at Barnesville, in the county of Belmont and State of Ohio, have invented certain new and useful Improvements in Plant Protectors, of which the following is a specification.

My invention relates to plant protectors and the main object of the invention is to furnish a device of this class that covers and protects the plants during their tender growth and gives ample support to them.

Another object of the invention is to provide a bleacher for such plants as celery and asparagus, and also what might be called a plant booster, that is to say, that the protector encloses the plant so that most of the rays of the sun will be excluded and that accordingly the plant stays white and does not receive its green coloring so soon, on account of the sides of the plant being covered up by the protector and they would also tend to grow faster to reach the light, which is only admitted from the top of the protector. The protector may also be used as a support for such plants as tomatoes, in which case the side covering of the protector may be removed.

One embodiment of the invention is illustrated in the accompanying drawings, in which, Figure 1 presents a perspective view of the plant protector in position over a plant;

Figure 2 is a vertical section of Figure 1; and

Figure 3 is a transverse section thereof.

In the drawings, reference numeral 10 represents a plant, around and over which the protector is placed. The protector includes a stem or post 11 preferably made of wire pointed at its lower end and bent to L-shape to form a handle 12 at its upper end. Upon this stem 11 is slidably mounted a frame preferably consisting of a flat band 13 in the shape of a hoop, at one side of which is formed an ear 14 engaging the stem 11, so as to be adjustable up and down thereon. The top edge of this frame has a sieve like top 15 stretched in the same and secured between the band 13 and a corresponding inner cylindrical cover 18, which is of sufficiently smaller diameter to tightly hold the turned down sides of the top, which consists of canvas, burlap, or other similar material. The overlapping edges 19 of the cover are riveted as at 20, or united in any other suitable manner for securing them together and the length of the cover is a little less than the height of the stem 11, so that the cover extends straight down from the frame to the ground, when the frame is situated at the top of the stem. This cylindrical cover may be made of sheet metal, linoleum, cardboard, or any similar fairly stiff material. It is evident that by this arrangement it is possible to entirely remove the cover 18, together with the top 15 from the frame 13 for exposing the plant, which, when it has reached sufficient height may be permitted to grow up through the frame and be supported thereby.

When erecting the protector over a plant, the stem 11, together with the frame, are placed in a suitable position close to the plant with the stem 11 pushed down into the ground to get a firm hold therein, after the top 15 and the cover 18 have been attached to the frame. This will then completely protect the plant on all sides. As no light can reach the plant, when enclosed in this manner, with the exception of through the top 15, the growth of the plant will be accelerated as the plant tends to reach the light, but at the same time the plant will remain pale and not turn green until the cover is removed.

The object of having the top 15 and the cover 18 secured in the frame in the manner described, is that the cover may be removed entirely by detaching the same from the cover 18, when the latter may be lowered to give support to the plant, which will then grow up through the same without hindrance of the top.

It is obvious that instead of making the frame circular, as shown in the drawing, it may be oblong or rectangular, so as to accommodate several plants, in which case more than one stem or support 11 may be used.

At the upper end of the cover 18 and immediately below the bottom edge of the band 13, several openings 21 are furnished in order to provide proper air circulation through the protector.

Having thus described the invention, what is claimed as new is:

1. A plant protector comprising a supporting stem adapted to be pushed down in the ground, an open frame slidably mounted upon said stem, and a cover suspended on said frame adapted to surround the plant.

2. A plant protector comprising a supporting stem adapted to be pushed down in the ground, an open frame slidably mounted upon said stem, and a cover suspended on said frame adapted to surround the plant, said cover being detachably secured upon said frame.

3. A plant protector comprising a supporting stem adapted to be pushed down in the ground, an open frame slidably mounted upon said stem, a top and a cover suspended on said frame adapted to surround the plant, said cover being detachably secured upon said frame, said cover and said open frame together forming clamping means for the detachable top.

4. A plant protector comprising a supporting stem adapted to be pushed down in the ground, an open frame slidably mounted upon said stem, and a screen top on said frame.

5. A plant protector comprising a supporting stem adapted to be pushed down in the ground, an open frame slidably mounted upon said stem, said frame consisting of an outer and an inner ring, and a screen secured between said rings forming a top for the frame.

6. A plant protector comprising a supporting stem adapted to be pushed down in the ground, an open frame slidably mounted upon said stem, said frame consisting of an outer and an inner ring, a screen secured between said rings forming a top for the frame, and a cover suspended on said frame adapted to surround the plant.

7. A plant protector comprising a supporting stem adapted to be pushed down in the ground, an open frame slidably mounted upon said stem, said frame consisting of an outer and an inner ring, a screen secured between said rings forming a top for the frame, and a cover suspended on said frame adapted to surround the plant, said cover being a continuation of said inner ring.

8. A plant protector comprising a supporting stem adapted to be pushed down in the ground, an open frame slidably mounted upon said stem, said frame consisting of an outer and an inner ring, a screen secured between said rings forming a top for the frame, and a cover suspended on said frame, said outer ring having ears engaging said stem.

In testimony whereof I affix my signature.

WILLIAM $\overset{\text{his}}{\times}$ H. HOBBS. [L. S.]
mark

Witnesses:
C. M. COLE,
J. H. CHANEY.